United States Patent [19]

Chalk et al.

[11] Patent Number: 5,547,482
[45] Date of Patent: Aug. 20, 1996

[54] METHOD OF MAKING FUSED SILICA ARTICLES

[76] Inventors: Julie B. Chalk, 370 E. Warren St., Elmira, N.Y. 14901; Jonathan C. Rowe, 119 Daffodil Dr., Horseheads, N.Y. 14845; Paul M. Schermerhorn, 4182 Meads Creek Rd., Painted Post, N.Y. 14870; Robert D. Shoup, 658 E. Lake Rd., Hammondsport, N.Y. 14840

[21] Appl. No.: 270,423

[22] Filed: Jul. 5, 1994

[51] Int. Cl.[6] ............................ C03B 8/02; C03B 20/00
[52] U.S. Cl. .......................... 65/17.2; 65/17.3; 65/17.4; 65/17.5; 65/17.6; 65/32.1
[58] Field of Search ..................... 65/17.6, 17.5, 65/17.2, 17.3, 17.4, 32.1, 144, 395, 427, 426

[56] References Cited

U.S. PATENT DOCUMENTS

| | | | |
|---|---|---|---|
| 3,261,676 | 7/1966 | Morelock | 65/17.6 |
| 4,336,048 | 6/1982 | van der Steen et al. | 65/18.4 |
| 4,728,351 | 3/1988 | Meerman | 65/18.1 |
| 4,789,389 | 12/1988 | Schermerhorn et al. | 65/3.12 |
| 4,857,092 | 8/1989 | Meerman | 65/18.4 |
| 4,961,767 | 10/1990 | Schermerhorn et al. | 65/2 |

*Primary Examiner*—Donald E. Czaja
*Assistant Examiner*—Sean Vincent
*Attorney, Agent, or Firm*—Angela N. Nwaneri; Clinton S. Janes, Jr.

[57] ABSTRACT

This invention is directed to the production of essentially defect-free high purity fused silica glass articles, the method comprising the following steps: (a) forming a green body from silica particulates or a porous body of amorphous silica; (b) sintering said body in a chamber by raising the temperature of the chamber to above 1720° C., while purging the chamber with helium or applying a vacuum to the chamber; and (c) consolidating the sintered body in a chamber by raising the temperature within the chamber to at least 1750° C., introducing an inert gas into the chamber at a pressure less than about 6.9 MPa (1000 psig), and cooling the chamber while maintaining the pressurized atmosphere to a temperature at least below the annealing point of the glass. In the most preferred practice, a green body of silica particulates will be prepared via a sol-gel process.

19 Claims, No Drawings

METHOD OF MAKING FUSED SILICA ARTICLES

FIELD OF THE INVENTION

The present invention is directed to a method for making articles of essentially defective-free, high purity fused silica from silica particulates or porous silica bodies. More primarily, the subject invention is drawn to a method for reducing the size of, and most desirably, totally eliminating the internal physical defects, for example, seeds and voids, developed in articles of fused silica prepared from silica particulates or porous silica bodies.

BACKGROUND OF THE INVENTION

The production of articles from silica particulates has customarily comprehended two very general steps:

(1) a green body is formed from the particulates; and (2) that green body is dried and sintered (consolidated) into an integral article.

In certain operations, for example, the flame hydrolysis or oxidation of a silica-containing compound capable of being thermally decomposed into amorphous silica particulates or in the shape of an amorphous porous preform, the latter will be subsequently sintered (consolidated) into an integral body.

The sintering step in each instance has generally been carried out through simple heating, through hot pressing, and/or through hot isostatic pressing. The present invention was generally concerned with providing a method yielding a superior final product than the methods of the prior art.

Whereas the inventive method is operable with silica particulates and porous bodies no matter how produced, it is especially suitable for use with articles of high purity fused silica formed through a sol-gel process. Accordingly, the present invention will be described in specific detail as utilized in conjunction with silica articles fashioned via the latter process.

U.S. Pat. No. 4,789,389 (Schermerhorn et al.) discloses the basic method for producing fused silica glass articles of very high purity utilizing a sol-gel process. The method contemplates seven general steps:

(1) a solution is prepared which contains at least one silicon-containing organic compound having the formula $Si(OR)_4$, wherein R is an alkyl group;

(2) the silicon in the solution is polymerized to form a $SiO_2$ gel;

(3) the gel is dried at a rate which causes the gel to fragment into granules having a mean particle size less than about 1 mm;

(4) the granules are sintered at a temperature less than about 1150° C., the density of the granules after sintering being approximately equal to their maximum theoretical density;

(5) a green body is formed from the sintered granules;

(6) the green body is dried and partially sintered in a chamber by (a) raising the temperature of the chamber to above about 1000° C., and (b) introducing chlorine gas into the chamber and/or subjecting the chamber to a vacuum and/or purging the chamber with an inert gas; and then (7) the green body is fully sintered in a chamber by raising the temperature of the chamber to above about 1720° C. while purging the chamber with helium or applying a vacuum to the chamber.

It is observed that, during the final sintering step, some voids and/or seeds were retained within the structure. U.S. Pat. No. 4,961,767 (Schermerhorn et al.), which patent was a division of U.S. Pat. No. 4,789,389, supra, teaches a further step of consolidating the sintered body via hot isostatic pressing in a chamber operating at a temperature above about 1150° C. with an inert gas being introduced into the chamber at a pressure above about 100 psig (~0.69 MPa).

In practicing this further step, argon has been customarily employed as the inert gas at pressures in excess of 1000 psig (~6.9 MPa). Whereas the hot isostatic pressing functions to reduce the number and size of the voids and/or seeds in the final product, argon has been found to penetrate the surface of the glass body up to about 0.25" (6.35 mm), causing a green fluorescing peripheral region plus creating increased birefringence and poor refractive index homogeneity. To overcome this problem, the outer fluorescing region is removed through grinding and polishing, thereby resulting in loss of glass. That loss, coupled with the additional step of hot isostatic pressing, quite obviously increase the cost of the product.

As was observed above, the overall primary objective of the present invention was to devise a method for reducing the size of, preferably totalling eliminating the internal defects, such as seeds and voids, developed in articles of fused silica prepared from silica particulates or porous silica bodies.

A very specific objective was to devise such a method which could be utilized in the manufacture of fused silica glass articles wherein the initial step in the production of those articles involves preparing silica particulates through a sol-gel process.

SUMMARY OF THE INVENTION

Whereas the present inventive method is operable in forming essentially defect-free silica articles from silica particulates and porous bodies no matter how produced, because, as was pointed out above, the method is especially applicable with articles prepared via a sol-gel process, it will be described with specific reference to the sol-gel process disclosed in U.S. Pat. No. 4,789,389, supra.

As was explained in that patent, silica gels can be prepared from fumed silica, but it is generally easier to make gels from silicon-containing organic compounds. Furthermore, because of the differences in the methods employed to manufacture them, higher purities can customarily be achieved in silicon-containing organic compounds than from fumed silica. Moreover, less pollution is generated during the production of the organic compounds than in the manufacture of fumed silica. Accordingly, in like manner to the disclosure of U.S. Pat. No. 4,789,389, the preferred precursor silica gels will be prepared from silicon-containing organic compounds. The preferred organic compound will have the formula $Si(OR)_4$ or $SiR(OR)_3$, wherein R is an alkyl group. The most preferred compound is $Si(OC_2H_5)_4$ (TEOS).

Stated most broadly and succinctly, the present invention omits the hot isostatic pressing procedure disclosed in U.S. Pat. No. 4,789,389 to consolidate the fully sintered body and substitutes therefor a process which has been termed pressure assisted sintering. The inventive process is carried out at much higher temperatures than are employed in isostatic pressing and with much lower pressures. Thus, the inventive pressure assisted sintering procedure contemplates temperatures of at least 1750° C. and pressures less than 1000 psig (~6.9 MPa), most preferably, less than 100 psig (~0.69 MPa). The gas pressures will be maintained during cooling of the consolidated body to a temperature at least below the annealing point of the glass.

In general terms, where an article of fused silica prepared from silica particulates is desired, the inventive method comprises:

(1) forming a green body from the silica particulates;

(2) drying and sintering the green body in a chamber by raising the temperature of the chamber to above 1720° C., while purging the chamber with helium or applying a vacuum to the chamber; and (3) consolidating the sintered green body in a chamber (which most desirably will be the same chamber wherein the particulates were sintered) by raising the temperature within the chamber to at least 1750° C., introducing an inert gas into the chamber at a pressure less than about 1000 psig (6.9 Mpa), cooling the chamber while maintaining the pressurized atmosphere to a temperature at least below the annealing point of the glass.

In a similar manner, where an article of fused silica prepared from an amorphous porous body is desired, the inventive method comprises:

(1) sintering the porous body in a chamber by raising the temperature of the chamber to above 1720° C., while purging the chamber with helium or applying a vacuum to the chamber; and (2) consolidating the sintered body in a chamber (which again most desirably will be the same chamber wherein the porous body was sintered) by raising the temperature within the chamber to at least 1750° C., introducing an inert gas into the chamber at a pressure less than 1000 psig (6.9 Mpa), and cooling the chamber while maintaining the pressurized atmosphere to a temperature at least below the annealing point of the glass.

Whereas the above description details sintering and consolidating as two steps, as pointed out above, the two can be merged into a single continuing step in the same firing chamber. Thus, for example, the vacuum sintering plus pressurization to reduce and/or remove sintered defects can be accomplished in the same furnace. And it is quite apparent that where helium comprises the inert gas, the purging of the chamber with helium can be subsequently followed by pressurizing the chamber with helium.

Similarly to U.S. Pat. No. 4,789,389, the inventive process is operable with doped fused silica glass articles. Accordingly, the glass article can be doped through the inclusion in the initial solution containing at least one silicon-containing organic compound having the formula $Si(OR)_3$ or $SiR(OR)_3$, wherein R is an alkyl group and said dopant consists of at least one element selected from the group consisting of aluminum, antimony, barium, bismuth, boron, bromine, cadmium, calcium, cerium, chlorine, chromium, cobalt, copper, europium, fluorine, germanium, iron, lanthanum, lead, lithium, magnesium, neodymium, nickel, oxygen, phosphorus, potassium, samarium, silver, sodium, strontium, tantalum, tin, titanium, uranium, vanadium, yttrium, zinc, and zirconium. Titanium is the preferred dopant because it can yield glasses exhibiting a very low linear coefficient of thermal expansion, e.g., $<0.5 \times 10^{-7}$/° C. over the temperature range 0°–300° C. The titanium will conveniently be introduced as $Ti(OR)_4$ where R is an alkyl group, with the preferred compound being selected from the group consisting of $Ti(OC_2H_5)_4$ and $Ti[OCH(CH_3)_2]_4$.

U.S. Pat. No. 4,789,389 and U.S. Pat. No. 4,961,767 are incorporated by reference in their entireties into the present disclosure.

PRIOR ART

U.S. Pat. No. 4,789,389 and U.S. Pat. No. 4,961,767 are believed to constitute the most relevant prior art.

DESCRIPTION OF PREFERRED EMBODIMENTS

Four 2" (5.08 cm) cubes of fused silica were prepared in accordance with U.S. Pat. No. 4,789,389, utilizing TEOS as the precursor silicon-containing organic compound and subjecting the green body to a final sintering temperature of 1765° C. under a vacuum. The presence of numerous seeds and/or voids was observed in the cubes. The cubes were placed in an electrically heated, controlled atmosphere chamber and subjected to the following temperature/pressure consolidation treatments utilizing He gas:
Heat at 25° C./minute to 1700° C.; Hold for 2 minutes and then introduce He gas; Heat at 25° C./minute to 1750° C.; Hold for 20 minutes at that temperature and pressure; and *Cool at furnace rate under He pressure.
Sample #1 - He at 300 psig (1.92 MPa) Sample #2 - He at 100 psig (0.69 MPa) Sample #3 - He at 500 psig (3.5 MPa) Sample #4 - He at 50 psig (0.35 MPa)

*The electric current to the chamber is cut off and the furnace allowed to cool with the sample retained therewith. The rate of cooling has been estimated to range about 15°–25° C./minute.

Each of the samples contained some seeds and/or voids, but the number and size thereof after this consolidation procedure were significantly reduced. The samples subjected to the higher pressures contained fewer and smaller seeds and/or voids. Whereas the above evaluations were subjective in nature, the experiments indicated the feasibility for the reduction of seeds and/or voids at pressures below 1000 psig (6.9 MPa) using an inert gas at elevated temperatures typical of those customarily employed in the final sintering step.

Another group of previously-sintered samples was subjected to high temperatures in the electrically heated, controlled atmosphere chamber, the primary goal of the experiments being to assess the effect of low pressures, viz., 25 psig (0.17 MPa) and 100 psig (0.69 MPa), upon the elimination or reduction in size of the seeds and/or voids, with a secondary goal to provide a comparison of the effectiveness of helium versus argon in collapsing seeds and/or voids. To this end, it was deemed important to determine the number and sizes of the seeds and/or voids in the test samples before exposing them to the controlled temperature/pressure conditions.

The samples were cylinders having diameters of about 3.5" (~8.9 cm) and heights of about 2.5" (~6.35 cm) that were sintered from high quality castings prepared from TEOS. Because of their high quality, the cylinders had relatively few seeds and/or voids, but enough to be able to map and size them prior to the consolidation step.

Each sample was heated rapidly (60° C./hour) to a top temperature and held at that temperature for 30 minutes to equilibrate the temperature, whereupon the gas was admitted to a desired pressure in less than 5 seconds. That pressure was maintained at the top temperature for 15 minutes and continued throughout the cool down. Fast cool down at furnace rate (F.R.) required about 80 minutes in helium and about 120 minutes in argon.

The table below records the conditions under which each experiment was made and the effects that those conditions exerted upon the number and size of the seeds and/or voids in each sample. Under the heading "Before" are entered the total number of seeds and/or voids (defects) in the sample and a broad breakdown of the sizes thereof. "Lgst" indicates the largest defects present. Where the total number exceeds the size breakdowns, the difference represents defects less than 200 μm in diameter. Under the heading "After" are entered the total number of defects in the sample and a measurement of the size of each after the consolidation heat/pressure treatment.

Examples 5 and 6 were heat pressurized with 100 psig (0.69 MPa) argon and 100 psig (0.69 MPa) helium at 1550° C. for 15 minutes before cooling. To assure that the procedures were equivalent, the samples were first heated to 1800° C. and thereafter cooled to 1550° C. under the same conditions as the previous Examples. The results were unexpected in that no defects were observed under microscopic examination. The softening point of fused silica is about 1581°, the temperature at which the glass exhibits a

TABLE

| Sample | Top Temp | Gas/Pressure | Cool Rate | Seeds and/or Voids Before | After |
|---|---|---|---|---|---|
| 1 | 1700 | Ar/100 psig | F.R. | 14<br>9 > 20 μm<br>4 > 40 μm<br>Lgst. 53 μm | None |
| 2 | 1800 | Ar/25 psig | F.R. | 15<br>6 > 20 μm<br>4 > 40 μm<br>Lgst. 70 μm | None |
| 3 | 1800 | He/100 psig | F.R. | 17<br>12 > 20 μm<br>5 > 40 μm<br>Lgst. 406 μm,<br>297 μm, 67 μm | None |
| 4 | 1800 | He/25 psig | F.R. | 18<br>8 > 20 μm<br>3 > 40 μm<br>Lgst. 186 μm,<br>92 μm | 3 |
| 5 | 1550 | He/100 psig | F.R. | 11<br>8 > 20 μm<br>1 > 40 μm<br>Lgst. 72 μm | None |
| 6 | 1550 | Ar/100 psig | F.R. | 14<br>5 > 20 μm<br>2 > 40 μm<br>Lgst. 51 μm,<br>58 μm | None |
| 7 | 1800 | Vacuum only | F.R. | 9<br>4 > 20 μm<br>1 > 40 μm<br>Lgst. 94 μm,<br>39 μm, 33 μm | 3<br>89 μm, 39 μm,<br>33 μm |
| 8 | 1800 | He/100 psig | F.R. | 54<br>Lgst. 1127 μm,<br>1118 μm, 985 μm,<br>192 μm, 731 μm,<br>656 μm, 640 μm,<br>573 μm | 13<br>143 μm, 140 μm,<br>133 μm, 96 μm,<br>92 μm, 66 μm,<br>62 μm, 52 μm,<br>49 μm, 48 μm,<br>48 μm, 46 μm,<br>42 μm, 37 μm |
| 9 | 1800 | He/100 psig | 100/hr | Lgst. 1102 μm,<br>968 μm, 937 μm,<br>824 μm, 571 μm,<br>531 μm, 517 μm,<br>423 μm, 402 μm | 245 μm, 239 μm,<br>200 μm, 167 μm,<br>165 μm, 153 μm,<br>106 μm, 105 μm,<br>98 μm, 85 μm,<br>81 μm, 63 μm |

As can be observed in the table, Examples 1 and 2 were pressurized in argon at 100 psig (0.69 MPa) and 25 psig (0.17 MPa), respectively, and no defects were seen in either. Examples 3 and 4, equivalent to Examples 1 and 2, but pressurized in helium, demonstrated complete defect elimination at 100 psig (0.69 MPa) and substantial removal at 25 psig (0.47 MPa), where only 3 defects remained at 2 μm and smaller. Those results are deemed to be highly significant because they indicate that the diffusion of helium into the fused silica is sufficiently slow to permit the applied pressure to collapse the defects before its diffusion equilibrates the pressure throughout the structure.

viscosity of about $10^{7.6}$ poises ($10^{6.6}$ Pa.s). Apparently, there was sufficient pressure at 100 psig (0.69 MPa) to effect glass flow to collapse the defects. It is believed that at high gas pressures the defects can be collapsed at temperatures where the glass demonstrates a viscosity of $10^{10}$ poises ($10^{9}$ Pa.s).

As can be appreciated, the temperature within the chamber drops when the gases are introduced. The drop with argon was considerably less than that experienced with helium. That is, the temperature dropped about 3° C., both at 1800° C. and at 1550° C. In contrast, the introduction of 100 psig (0.69 MPa) helium caused a temperature drop of 17° C. at 1800° C. from which the chamber recovered in about 5 minutes. The 100 psig (0.69 MPa) helium resulted in a temperature drop of 12° C. at 1550° C. from which the chamber recovered in about 5 minutes. It will be appreciated that through careful process control, particularly introducing He and Ar at slower rates, the extent of temperature drop can be significantly reduced.

Example 7 comprised the control experiment in which vacuum was maintained throughout both the heating to 1800° C. and the cool down. This experiment was conducted to confirm that a simple reheat of the sintered body would not eliminate the defects. The results indicate that the large defects were essentially untouched, but the six defects having diameters below 30 μm were removed. These data suggest the following hypothesis; viz., defects below a certain critical size (presumably <30 μm) will collapse under their own surface tension pressures, but defects having larger diameters demand external pressure to collapse.

Examples 8 and 9 were selected for pressure testing because they contained many defects which were readily visible. Example 8 utilized a relatively fast cool (furnace rate) under 100 psig (0.69 MPa) helium, whereas Example 9 utilized a slow cooling rate under 100 psig (0.69 MPa) helium. Example 8 had 34 defects with diameters >100 μm prior to treatment, but only 3 defects with diameters >100 μm after the pressure treatment. In contrast, Example 9, which contained a similar number and distribution of defects before the pressure treatment, had 6 defects >100 μm and 3 defects >200 μm after the treatment. Hence, whereas Example 9 evidenced a significant reduction in the number of defects and a decrease in the size of the remaining defects, the latter defects were proportionally larger than those remaining in Example 8. This phenomenon suggests that the slow cooling rate may have allowed the helium to diffuse into the glass where it could equilibrate internal pressure with external pressure at a temperature at which some seed regrowth could occur. In Example 9 the glass was at a temperature above its softening point for about 2.5 hours, whereas in Example 8 the glass was at a temperature above 1580° C. for only about 18 minutes and above 1000° C. for about 26 minutes. The slow cooling of Example 9 would provide adequate time for some defect regrowth, particularly if there is some residual gas within the seeds. Thus, rapid cooling, i.e., >10° C./minute, constitutes the preferred practice. This problem can be solved, however, by employing higher pressures of helium or using appropriate pressures of argon, which gas does not diffuse into the glass as rapidly as helium.

Helium with its small atomic diameter is the preferred gas for collapsing defects ranging in diameter up to about 300μm, because it does not impart any gradient refractive index properties to the glass. Argon may be more useful where the defects are larger inasmuch as its larger atomic diameter (hence, lower diffusion rate) results in a gradient in pressure for a longer interval of time than helium before diffusion of the argon into the glass causes equilibration of pressure such that the defect will no longer be compressed. Helium will easily diffuse out of the glass during cooling down or in an annealing operation (~1100° C.). Argon can likewise be diffused out of the glass during cooling under a vacuum at temperatures below about 1400° C. where the glass viscosity is sufficiently high to resist the regrowth of any residual defects. Other inert gases such as neon, xenon and krypton with larger atomic diameters would likewise be effective, but their costs are significantly greater than helium and argon.

Whereas much higher pressures can be employed, from the viewpoint of a pressure chamber designed to operate at temperatures above 1750° C., it is preferred to utilize gas pressures no higher than about 1000 psig (6.9 MPa) and, most preferably, no higher than 100 psig (0.69 MPa) for safety concerns. Laboratory experimentation has suggested a minimum gas pressure of about 5 psi (0.035 MPa).

The use of hydrogen is contemplated, but extreme care must be exercised because of its explosive tendencies. Furthermore, hydrogen readily diffuses into the glass. Accordingly, He and Ar constitute the preferred gases.

The present invention eliminates the need for hot isostatically pressing the sintered glass bodies at high pressures to remove defects therefrom with the accompanying disadvantages of gases penetrating into the body to create inhomogeneity problems such as variations in refractive index throughout the body.

What is claimed is:

1. A method of producing an essentially defect-free, fused silica glass article from fused silica glass particulates comprising the steps of:

(a) forming a green body from said silica glass particulates;

(b) drying and sintering said green body in a chamber by raising the temperature of the chamber to above 1720° C. while purging the chamber with helium or applying a vacuum to the chamber to form a sintered body; and (c) consolidating said sintered body by applying pressure to said body in said chamber and raising the temperature within the chamber to at least 1750° C., introducing an inert gas into the chamber at a pressure less than about 6.9 MPa, and cooling the chamber while maintaining the pressurized atmosphere to a temperature below the annealing point of said glass.

2. A method according to claim 1 wherein said silica glass particulates are doped through the inclusion of at least one element selected from the group consisting of aluminum, antimony, barium, beryllium, boron, bromine, cadmium, calcium, cerium, chlorine, chromium, cobalt, copper, europium, fluorine, germanium, iron, lanthanum, lead, lithium, magnesium, neodymium, nickel, oxygen, phosphorous, potassium, samarium, silver, strontium, tantalum, tin, titanium, uranium, vanadium, yttrium, zinc and zirconium.

3. A method according to claim 2 wherein the element is titanium and the glass article has a linear coefficient of thermal expansion over the temperature range of 0°–300° C. of less than $0.5 \times 10^{-7}/°$ C.

4. A method according to claim 1 wherein said inert gas is selected from the group consisting of hydrogen, helium, neon, argon, krypton, and xenon.

5. A method of producing an essentially defect-free, fused silica glass article from a porous body of amorphous silica comprising the steps of:

(a) sintering said porous body in a chamber by raising the temperature of the chamber to above 1720° C., while purging the chamber with helium or applying a vacuum to the chamber to form a sintered body; and (b) consolidating said sintered body by applying pressure to the sintered body in said chamber and raising the temperature within the chamber to at least 1750° C., introducing an inert gas into the chamber at a pressure less than about 6.9 MPa, and cooling said chamber while maintaining the pressurized atmosphere to a temperature below the annealing point of said glass.

6. A method according to claim 5 wherein said porous body of amorphous silica is doped through the inclusion of at least one element selected from the group consisting of aluminum, antimony, barium, beryllium, boron, bromine, cadmium, calcium, cerium, chlorine, chromium, cobalt, copper, europium, fluorine, germanium, iron, lanthanum, lead, lithium, magnesium, neodymium, nickel, oxygen, phosphorous, potassium, samarium, silver, strontium, tantalum, tin, titanium, uranium, vanadium, yttrium, zinc and zirconium.

7. A method according to claim 5 wherein said sintering and consolidating are carried out in the same chamber.

8. A method according to claim 5 wherein said inert gas is selected from the group consisting of hydrogen, helium, neon, argon, krypton, and xenon.

9. A method of producing an essentially defect-free fused silica glass article comprising the steps of:

(a) preparing a solution which contains at least one silicon-containing organic compound having the formula $Si(OR)_4$, or $SiR(OR)_3$, where R is an alkyl group;

(b) polymerizing the silicon in the solution to form a $SiO_2$ gel;

(c) drying the gel at a rate which causes the gel to fragment into granules having a mean particle size less than about 1 mm;

(d) sintering the granules at a temperature less than about 1150° C., the density of the granules after sintering being approximately equal to their maximum theoretical density;

(e) forming a green body from the sintered granules;

(f) drying and partially sintering the green body in a chamber by raising the temperature of the chamber to above about 1000° C. and thereafter subjecting the green body to one or more further step selected from the group consisting of introducing chlorine gas into the chamber, subjecting the chamber to a vacuum, and purging the chamber with an inert gas;

(g) fully sintering the green body in said chamber by raising the temperature of the chamber to above 1720° C. while purging the chamber with helium or applying a vacuum to the chamber to form a fully sintered body; and then (h) consolidating the fully sintered body by applying pressure to the body in said chamber and raising the temperature within the chamber to at least 1750° C., introducing an inert gas into the chamber at a pressure less than about 1000 psig (6.9 MPa), and thereafter cooling the chamber while maintaining the pressurized atmosphere to a temperature below the annealing point of said glass.

10. A method according to claim 9 wherein the solution of step (a) contains tetraethylorthosilicate having the formula $Si(OC_2H_5)_4$.

11. A method according to claim 9 wherein the glass article is doped through the inclusion in the solution of step (a) of at least one element selected from the group consisting of aluminum, antimony, barium, beryllium, boron, bromine, cadmium, calcium, cerium, chlorine, chromium, cobalt, copper, europium, fluorine, germanium, iron, lanthanum, lead, lithium, magnesium, neodymium, nickel, oxygen, phosphorus, potassium, samarium, silver, sodium, strontium, tantalum, tin, titanium, uranium, vanadium, yttrium, zinc, and zirconium.

12. A method according to claim 11 wherein the element is titanium and the glass article has a linear coefficient of thermal expansion over the temperature range 0°–300° C. of less than $0.5\times10^{-7}/°$ C.

13. A method according to claim 12 wherein the titanium is introduced into the solution as a titanium ester having the formula $Ti(OR)_4$, wherein R is an alkyl group.

14. A method according to claim 13 wherein the titanium ester is selected from the group consisting of tetraethyl titanate having the formula $Ti(OC_2H_5)_4$ and tetraisopropyl titanate having the formula $Ti[OCH(CH_3)_2]_4$.

15. A method according to claim 9 wherein said inert gas of step h is introduced into said chamber at a pressure no higher than about 100 psig (0.69 MPa).

16. A method according to claim 15 wherein said inert gas is introduced into said chamber at a pressure of at least 5 psig (0.035 MPa).

17. A method according to claim 9 wherein said inert gas is introduced into said chamber at a temperature at which the glass exhibits a viscosity no greater than $10^{10}$ poises ($10^8$ Pa.s).

18. A method according to claim 9 wherein said drying, sintering, and consolidating of said green body are carried out in the same chamber.

19. A method according to claim 9 wherein said inert gas is selected from the group consisting of hydrogen, helium, neon, argon, krypton, and xenon.

* * * * *

UNITED STATES PATENT AND TRADEMARK OFFICE
CERTIFICATE OF CORRECTION

PATENT NO. : 5,547,482

DATED : August 20, 1996

INVENTOR(S) : Julie B. Chalk, Jonathan C. Rowe, Paul M. Schermerhorn and Robert D. Shoup It is certified that error appears in the above-indentified patent and that said Letters Patent is hereby corrected as shown below:

On the title page, insert the following Assignee:
Corning Incorporated, Corning, NY Signed and Sealed this Fifteenth Day of April, 1997

*Attest:*

BRUCE LEHMAN

*Attesting Officer*     *Commissioner of Patents and Trademarks*